US005261711A

United States Patent [19]

Mizuki et al.

[11] Patent Number: 5,261,711

[45] Date of Patent: Nov. 16, 1993

[54] ACTUATOR OF VEHICLE DOOR LOCK DEVICE

[75] Inventors: Tetsuro Mizuki; Osamu Hamaguchi; Patrik J. Dowling, all of Nirasaki, Japan

[73] Assignee: Mitsui Kinzoku Kogyo Kabushiki Kaisha, Tokyo, Japan

[21] Appl. No.: 921,665

[22] Filed: Jul. 30, 1992

[30] Foreign Application Priority Data

Aug. 1, 1991 [JP] Japan ................................ 3-216138

[51] Int. Cl.[5] ............................................ F16D 43/16

[52] U.S. Cl. .................................. 292/201; 74/89.18

[58] Field of Search ..................... 292/336.3, 201, 216; 74/625, 405, 22 A, 89.18; 192/84 A, 84 B, 71, 74, 84 PM, 105

[56] References Cited

U.S. PATENT DOCUMENTS 2,162,075 6/1939 Floraday ........................... 74/89.18

4,093,289 6/1978 Inabayashi et al. ............. 292/201 X 4,520,914 6/1985 Kagiyama et al. ............. 292/201 X

*Primary Examiner*—Richard E. Moore

*Attorney, Agent, or Firm*—Browdy and Neimark

[57] ABSTRACT

An actuator of a vehicle door lock device, which includes an output shaft adapted at one end to be coupled with to a lock lever of the lock device, a sector arm for rotating the output shaft, a reversible motor for rotating the sector arm around said output shaft through speed reduction gears and a plastic-made housing for accommodating the output shaft, the sector arm and the reversible motor. The sector arm has, on an inner surface of its outer arc-shaped flange, an inner toothed portion which meshes with a final gear of the reduction gears and an arc hole centering the output shaft. An intermediate shaft for supporting the final gear is arranged in parallel with the output shaft and projects through the arc hole.

5 Claims, 7 Drawing Sheets

ACTUATOR OF VEHICLE DOOR LOCK DEVICE

BACKGROUND OF THE INVENTION (1) Technical Field

The present invention relates to an actuator of a vehicle door lock device.

(2) Description of the Prior Art

Nowadays, it is well known that an actuator of a vehicle door lock device, as shown in FIG. 9, may consist of an output shaft A connected to a lock lever of the lock device, a sector arm B secured to the output shaft A, a cylindrical worm C engaging with the sector arm B, a reversible motor F for rotating the cylindrical worm C through a pair of speed reduction gears D and E, and a rubber stopper G abutting with the sector arm B after the sector arm B rotates by a predetermined arc.

According to the known actuator above, a toothed portion H is formed on an outer periphery surface of the sector arm B, and resultantly the cylindrical worm C and the sector arm B are placed in the same plane, so that it is impossible to effectively use a space below the sector arm B.

SUMMARY OF THE INVENTION

Consequently, it is a purpose of the present invention to provide an actuator for the vehicle door lock device, having a sector arm provided with an inner gear and a gear engaging with the inner gear or toothed portion overlapped with the sector arm in order to effectively use an interior space of the housing of the lock device.

It is another purpose of the present invention to provide an actuator of the vehicle door lock device, having no rubber stopper for stopping the sector arm.

It is still another purpose of the present invention to provide an actuator of the vehicle door lock device easy to install parts, in particular a motor on the actuator.

BRIEF DESCRIPTION OF THE DRAWINGS

The preferred embodiment of the present invention is now described in more particularly with reference to the accompanying drawings, in which.

DESCRIPTION OF THE PREFERRED EMBODIMENT

Figure 1:
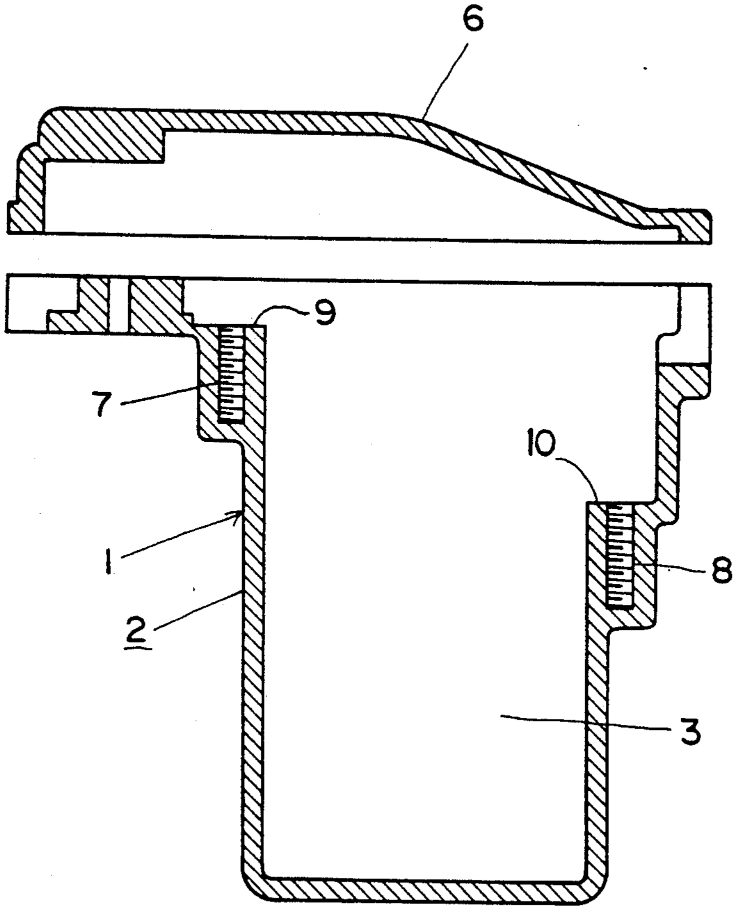
FIG. 1 is a section of a housing of the actuator.

As shown in FIG. 1 to FIG. 4, the housing 1 of the actuator of the vehicle door lock device according to the present invention consists of a lower case 2 having a compartment 3 containing a motor holder 4 to which a reversible motor 5 is attached, and a cover 6, respectively made of a plastic material. The case 2 has female threaded holes 7 and 8, and flat portions 9 and 10, respectively formed at the heads or top portions of the female thread holes 7 and 8.

The motor holder 4 is also made of a plastics or synthetic resin material. The motor 5 is secured by contacting the motor 5 onto a lower face 11 of the motor holder 4, inserting screws 14 and 15 into holes 12 and 13 of the lower face 11, and then threading the screws. A shaft 16 of the motor 5 passes through a through hole 17 formed in the lower face 11 and projects upward. A gear 18 is secured onto the projected portion of the shaft 16. End portions of the cords 21 and 22 are secured to terminals 19 and 20 of the motor 5. A L-shaped guide claw 24 leaving a passage 23 is integrally formed in the holder 4. The guide claw 24 is used to hold tightly the lengthes of the cords 21 and 22.

Figure 2:
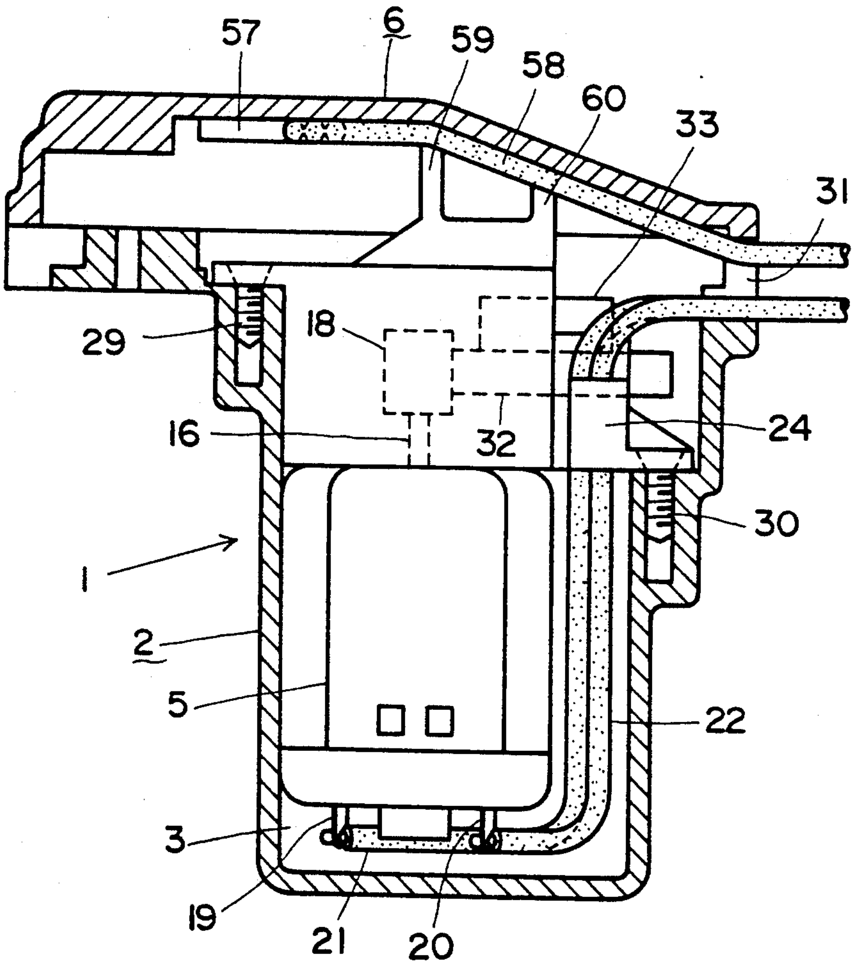
FIG. 2 is a section of the housing into which a holder with a motor attached thereon is inserted.
Figure 3:
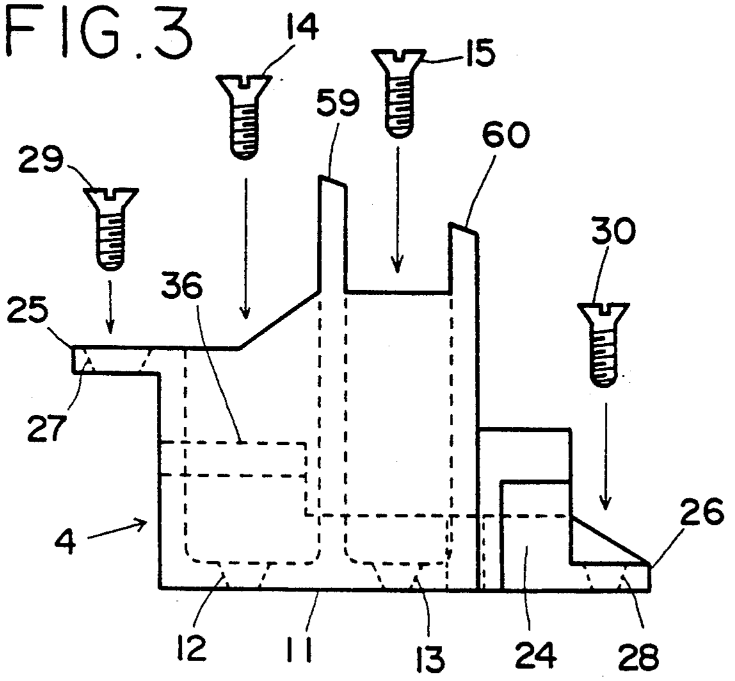
FIG. 3 is a front view of the motor holder.
Figure 4:
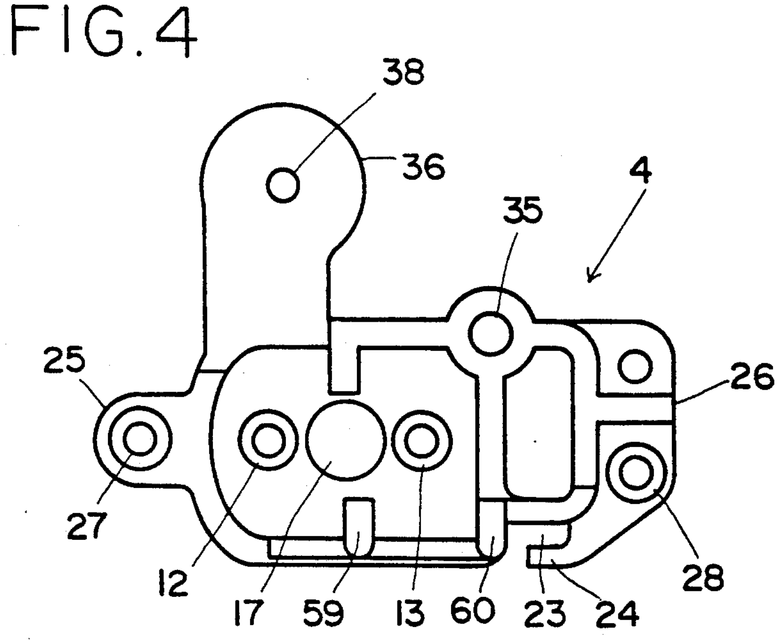
FIG. 4 is a flat view of the motor holder.

The holder 4 has a pair of flanges 25 and 26, respectively contacting with the flat portions 9 and 10. Respective flanges 25 and 26 have through holes 27 and 28 matched with the female thread holes 7 and 8. As shown in FIG. 2, the motor holder 4 to which the motor 5 previously attached by the screws is inserted into the compartment 3 of the lower case 2 and secured by the screws 29 and 30. Because the lengthes of the cords 21 and 22 of the motor 5 are held by the guide claw 24 during threading operations of the screws 29 and 30, assembling operation of the motor holder to the housing 1 is considerably made easy resulting in an improved working efficiency. It is noted that other ends of the cords 21 and 22 are taken out of the exit 31 formed between the lower case 2 and the cover 6.

Figure 5:
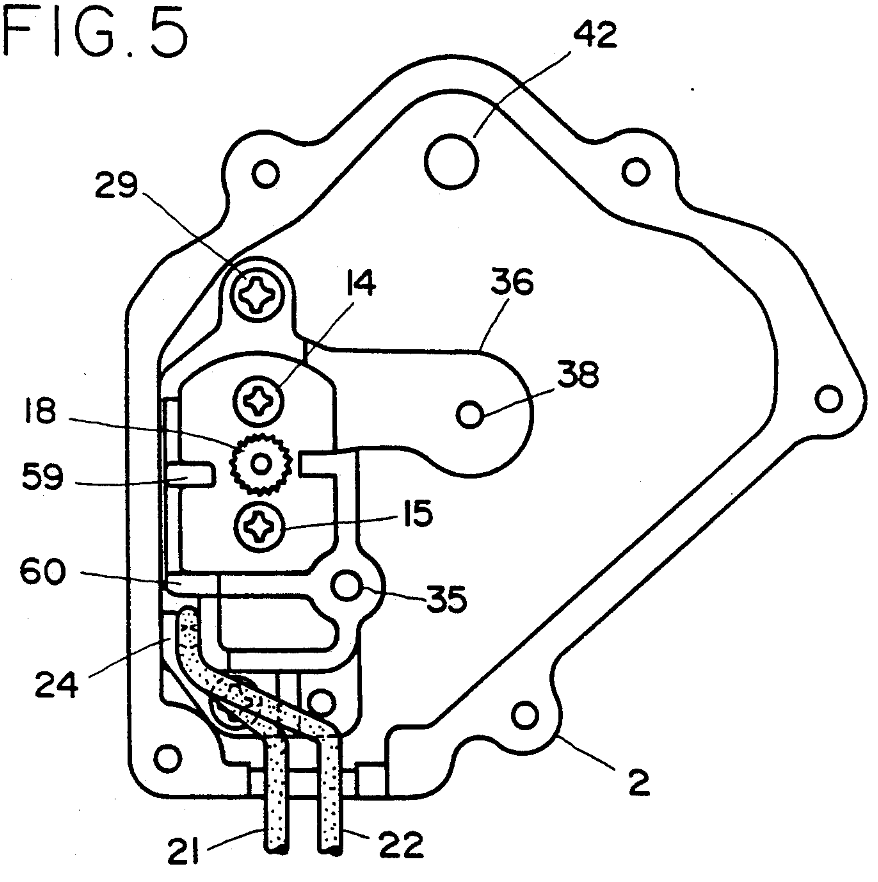
FIG. 5 is a flat view of a lower case into which the motor holder is inserted.
Figure 6:
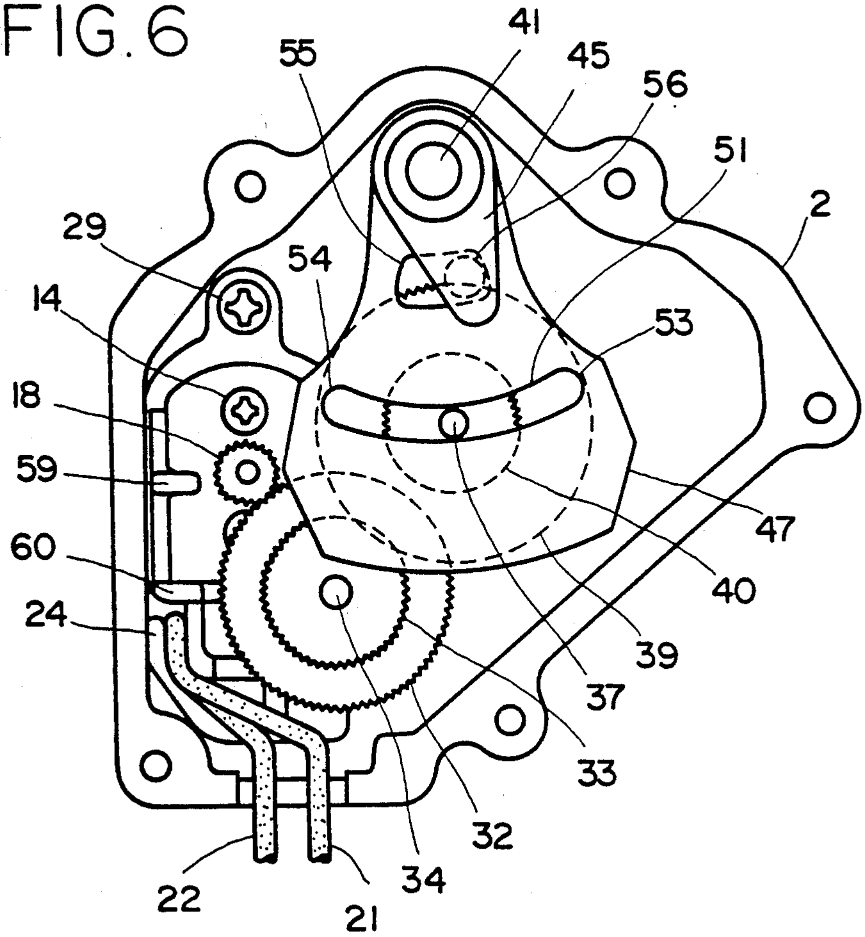
FIG. 6 is a flat view of the lower case containing parts of the actuator.

The motor holder 4 has as apparently shown in FIGS 5 and 6 a shaft hole 35 rotatably supporting a lower end of an intermediate shaft 34 on which a large diameter gear 32 and a small diameter gear 33 are secured. The large diameter gear 32 engages with the gear 18 of the motor 5. The motor holder 4 has a support arm 36 projecting sideways, which support arm has a shaft hole 38 for rotatably supporting a lower end of the intermediate shaft 37. The intermediate shaft 37 has a large diameter gear 39 engaging with the small diameter gear 33 and a small diameter gear 40 formed integrally with the large diameter gear 39, respectively secured to the intermediate shaft 37. Integral forming the shaft holes 35 and 38 in the motor holder 4 to hold the intermediate shafts 34 and 37 improves a precision of attaching distances of the motor 5 to respective speed reductions gears.

Figure 7:
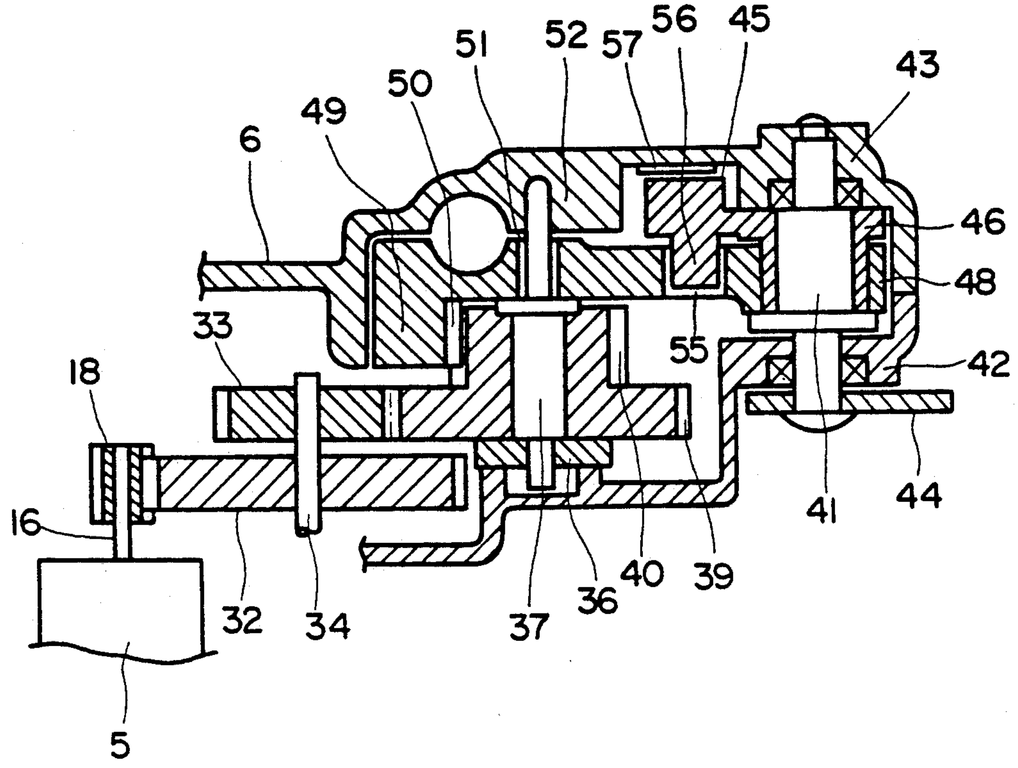
FIG. 7 is an expanded section of the actuator.
Figure 8:
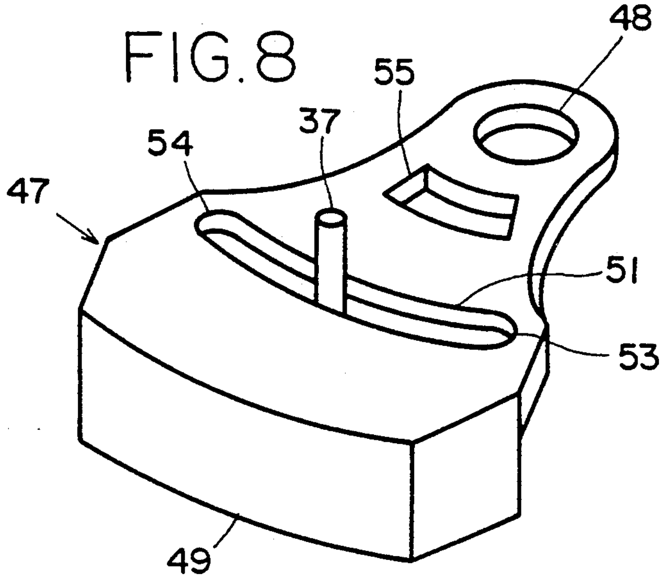
FIG. 8 is a perspective view of the sector arm.
Figure 9:
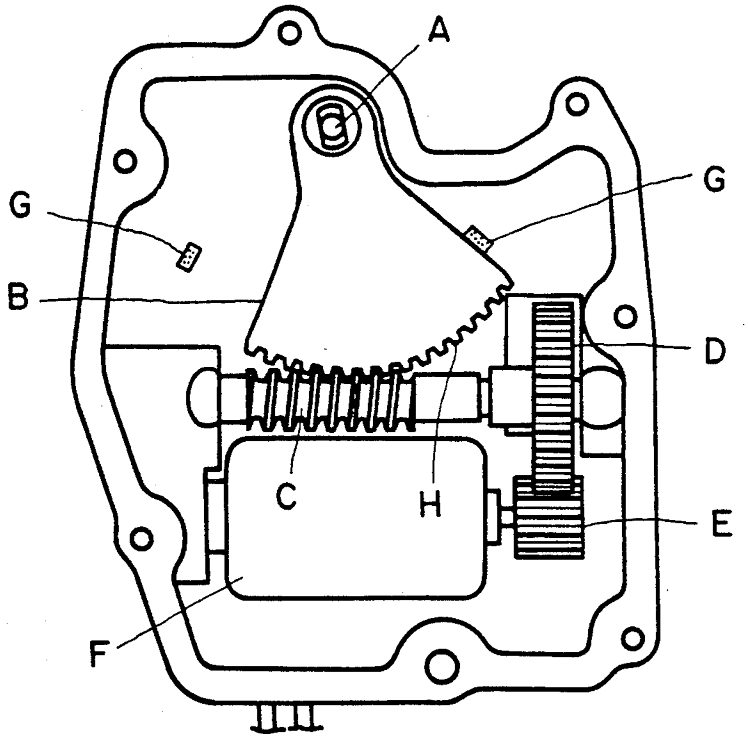
FIG. 9 (PRIOR ART)
FIG. 9 is a flat view of the conventional actuator.

As shown in FIG. 7, the output shaft 41 is rotatably supported on the boss 42 of the lower case 2 and the boss 43 of the cover 6. A lower end of the output shaft 41 downward projects through the boss 42 and a lock lever 44 of the conventional door lock device is secured to a projected end of the output shaft 41. A hub 46 of the intermediate lever 45 is secured to an outside periphery of the output shaft 41. The intermediate lever 45, output shaft 41, and lock lever 44 integrally rotate. When the door lock device, for example, is locked, the intermediate lever 45 is placed at its locked position.

A sleeve 48 of the sector arm 47 is rotatably supported onto an outer periphery of the hub 46 of the intermediate lever 45 through which lever the output shaft 41 is inserted. An outside edge of the sector arm 47 projects passing the small diameter gear 40, and a flange 49 provided with an inner gear 50 engaging with the small diameter gear 40 is integrally formed on a lower portion of the outside edge of the sector arm 47. Consequently, it is possible to effectively use a space below the sector arm 47 miniaturizing the whole construction of the actuator of the present invention.

A top end of the intermediate shaft 37 projects upward-through an arc hole 51 of a center of the output shaft 41 of the sector arm 47 and is rotatably received in the boss 52 of the cover 6. A length of the arc hole 51 is determined or set so as to abut one of the ends 53 and 54 of the arc hole 51 with the intermediate shaft 37 halting the sector arm 47 after the sector arm 47 rotates by a predetermined arc by means of the motor 5 and respective gears. As a result, again no rubber stopper of the sector arm is necessary. By the way, energizing the motor 5 is adapted to be carried out for a predetermined time length by means of a timer (not shown).

Between the sleeve 48 of the sector arm 47 and the arc hole 51, an oval hole 55 centering the output shaft 41 is formed. A protrusion 56 of the intermediate lever 45 faces to the oval hole 55. Consequently, when the motor 5 rotates the sector arm 47 through a group of the gears, the oval hole 55 and the protrusion 56 engages with each other making the intermediate lever 45 and the lock lever 44 rotate. Thus, it is possible to exchange the lock device from its locked or unlocked condition to another one. It is possible to directly secure the sector arm 47 to the output shaft 41 and omit the intermediate lever 45 from the construction.

In the cover 6, there is a sensor 57 for detecting positions of the intermediate lever 45 is placed. When the sensor 57 detects the position of the intermediate lever 45, the condition of the door lock device is known whether it is of a locked one or unlocked one. A cord 58 of the sensor 57 is led to the outside through the exit 31 similar to the case of the cords 21 and 22 as shown in FIG. 2. The mid-portion of the cord 58 is sandwiched and held by the protrusions 59 and 60 of the motor holder 4 and the cover 6.

According to the actuator of the present invention having the construction mentioned above, when the sector arm 47 rotates around the shaft 41 by the motor 5 through the group of gears 18, 32, 33, 39 and 40, the oval hole 55 engages with the protrusion 56, so that the intermediate lever 45 rotates. Consequently, the lock lever 44 adapted to rotate cooperatively with the intermediate lever 45 exchanges a condition of the lock device to its locked one or a unlocked one. After the sector arm 47 rotates by an arc necessary to exchange the lock device, one of the ends 53 and 54 of the arc hole 51 abuts with the intermediate shaft 37 in order to stop the rotating sector arm 47.

Effects of the present invention obtained in the embodiment of the actuator of the vehicle door lock device will be described.

Because the sector arm 47 has the inner toothed portion 50 and a final speed reduction gear 40 engaging with the inner toothed portion 50 is placed below the sector arm 47, the space below the sector arm 47 can be used.

In addition, because the shaft 37 of the speed reduction gear 40 passes through the arc hole 51 of the sector arm 47, it is not necessary to use any rubber stopper in order to stop the moving sector arm 47.

Because the motor holder 4 has a guide claw 24 holding the cords 21 and 22, which being formed on the holder, the cords 21 and 22 don't hinder or obstruct the smooth assembling work of parts and the easy installation of the motor 5 on the lower case 2.

A shaft hole supporting the shaft of the speed reduction gear is improved.

What is claimed is:

1. An actuator of a vehicle door lock device, which includes an output shaft adapted at one end to be coupled to a lock lever of said lock device, a sector arm for rotating said output shaft, a reversible motor for rotating said sector arm around said output shaft through speed reduction gears and a plastic-made housing for accommodating said output shaft, said sector arm and said reversible motor, characterised in that said sector arm has, on an inner surface of its outer arc-shaped flange, an inner toothed portion which meshes with a final gear of said reduction gears, and an intermediate shaft for supporting said final gear is arranged in parallel with said output shaft.

2. The actuator of the vehicle door lock device according to claim 1, characterised in that said sector arm has an arc hole centering said output shaft, and said intermediate shaft projects through said arc hole.

3. The actuator of the vehicle door lock device according to claim 1, characterised in that a plastics-made motor holder is inserted into the lower case of said housing after said motor is secured to said motor holder by means of screws, and said motor holder has a guide claw for tightly holding cords of said motor.

4. The actuator of the vehicle door lock device according to claim 3, characterised in that said motor holder has a shaft hole integrally formed therein so as to rotatably support one end of said intermediate shaft.

5. The actuator of the vehicle door lock device according to claim 4, characterised in that a sensor for detecting positions of said output shaft is disposed on a cover of said housing, and cords of said sensor are sandwiched between said cover and said motor holder.

* * * * *